Jan. 30, 1940.          P. E. KOSTER          2,188,606
GYROSCOPIC APPARATUS FOR DETERMINING THE INCLINATION OF AN AIRPLANE
Filed May 16, 1938
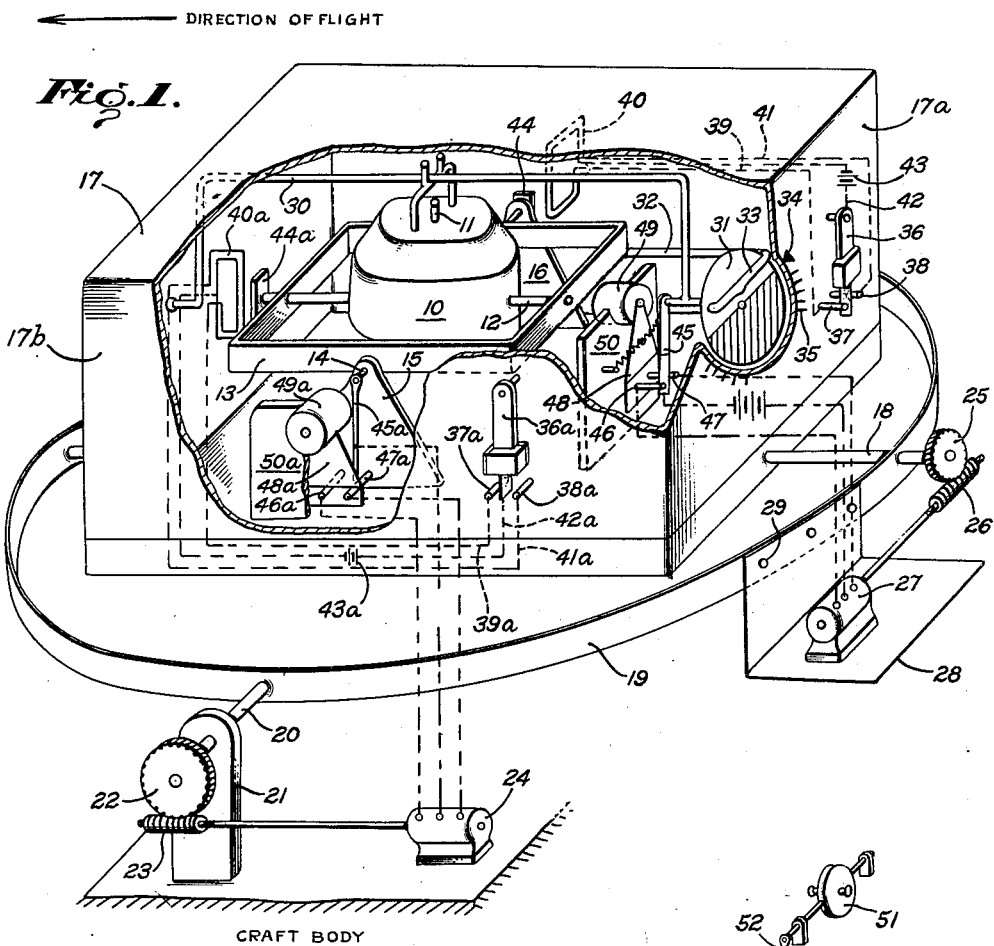
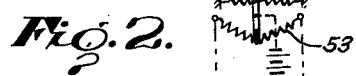
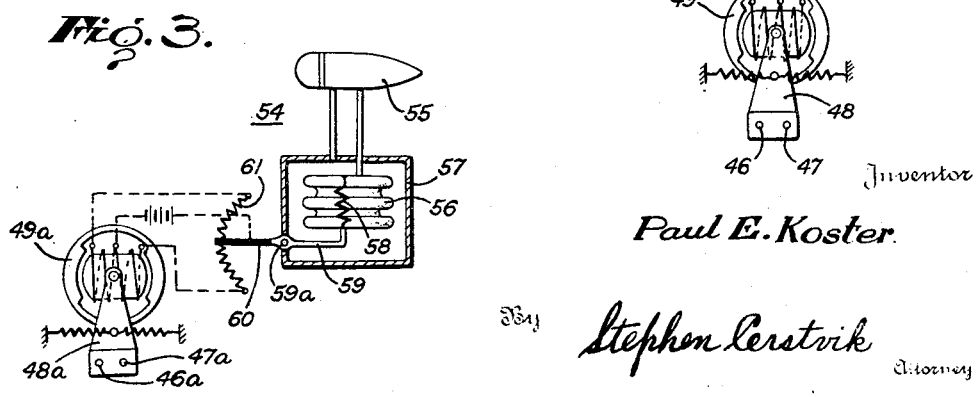
Inventor
Paul E. Koster.
By Stephen Cerstvik
Attorney Patented Jan. 30, 1940

2,188,606

UNITED STATES PATENT OFFICE 2,188,606

GYROSCOPIC APPARATUS FOR DETERMINING THE INCLINATION OF AN AIRPLANE

Paul Eduard Koster, Berlin, Germany, assignor to Siemens Apparate und Maschinen Gesellschaft mit beschränkter Haftung, Berlin, Germany, a corporation of Germany Application May 16, 1938, Serial No. 208,289
In Germany October 18, 1935

10 Claims. (Cl. 33—204)

The present invention relates to gyroscopic attitude-indicating devices for aircraft and more particularly to gyroscopic attitude-indicating devices wherein deviations of the gyroscopic element due to friction, rotation of the earth, or other causes are automatically corrected, and is a continuation in part of application Serial No. 106,263, filed October 17, 1936.

In devices of the prior art, pendulous means have been utilized to produce automatic correction of deviations of the gyroscopic element but upon travel in a curved path, upon a change in speed, or upon the occurrence of any type of acceleration, such correction has been seriously affected.

Devices of the prior art have also been provided wherein the effect of the pendulous means has been suspended during the occurrence of any acceleration forces. While this latter type of correction device does not of itself cause any errors in the indication of the gyroscopic element, it fails to correct the deviations of the gyroscopic element during travel in a curved path, during which travel a correct attitude indication is most needed.

Further, there have also been provided in the prior art, devices whereby the deviation of the gyro element has been automatically corrected during all occurrences of acceleration, including that occurring during travel in a curved path, but it is to be noted that said devices have necessitated the movement of the entire craft in order to effect automatic correction, thereby causing a departure from the correct attitude of the craft.

In view of the above conditions existing in the prior art, one of the objects of the present invention is to provide novel automatic correcting means whereby the foregoing disadvantages are eliminated.

Another object is to provide a device embodying novel means for automatically correcting the deviation of a gyroscopic element during both straight level flight and departures therefrom.

A further object is to provide a novel method of correcting the deviations of a gyroscopic element during all conditions of flight.

Still another object is to provide novel means for automatically correcting the deviations of a gyro element wherein the proper attitude of the craft remains unchanged during the application of the correction.

A further object is to provide novel means for producing automatically corrected indications of the true horizon during flight in a curved path.

A still further object is to provide novel means for automatically correcting the indication of an artificial horizon comprising a body moveable with respect to the craft in order to apply said correction.

The above and further objects and advantages of the invention will appear more fully hereinafter from the detailed description which follows taken together with the accompanying drawing wherein is illustrated one embodiment of the invention. It is to be expressly understood, however, that the drawing is for the purposes of illustration and description only and is not designed as a definition of the limits of the invention, reference primarily being had for this purpose to the appended claims.

In the drawing wherein like reference characters refer to like parts throughout the several views;

Fig. 1 is a schematic illustration of a novel structure embodying the present invention;

Fig. 2 is a schematic illustration of novel means for controlling the device of Fig. 1 upon movement of the craft about its longitudinal axis; and Fig. 3 is a schematic illustration of novel means for controlling the device of Fig. 1 upon movement of the craft about its lateral axis.

Referring to the drawing and more particularly to Fig. 1, the gyroscopic device comprises a casing 10 within which is journalled a rotor (not shown) for spinning about a vertical axis 11. The casing is pivoted for oscillation about the horizontal axis 12 and by means of the gimbal 13 about the axis 14 at right angles to axis 12 and perpendicular to the vertical axis 11. Gimbal 13 is mounted in pillow blocks 15 and 16 carried by body element 17.

According to the novel principle of the present invention, element 17 is mounted for oscillation about the axis 18 mounted in ring 19 which in turn is mounted for oscillation with respect to the craft about the axis 20 mounted in blocks 21 (only one of which is shown) rigidly connected to the craft. Mounted on one end of axis 20 is worm gear 22 engaging with worm 23 connected to motor 24 for actuation thereby. Mounted on the end of shaft 18 is worm gear 25 engaging with worm 26 connected to motor 27 for actuation thereby, the motor 27 being carried by bracket 28 mounted upon ring 19 by means of rivets 29.

Rotational movement of the gyro 10 about axis 12, lying in the direction of flight, is transferred by crank 30 to the horizon disc 31. The rotational movement of the gyroscopic element about the axis 14 is transferred by the gimbal 13 to arm 32 carrying at one extremity thereof the aircraft model 33 for movement over disc 31. The position of the aircraft model with respect to the gyroscopic horizon of the disc 31, is indicated by the index 34 and scale 35 provided on the end 17ᵃ of body 17.

Also mounted on end 17ᵃ for oscillation about an axis parallel to axis 12 is a pendulum 36 cooperating with contacts 37 and 38. Contact 37 is electrically connected by conductor 39 to one end of the magnet coil 40 while contact 38 is connected to the other end of coil 40 by means of conductor 41.

Pendulum 36 is connected by means of conductor 42 and battery 43 to the mid-point of coil 40. Permanent magnet 44 is mounted at one end of axis 14 in proximity to coil 40 whereby the magnet 44 cooperates with the magnetic field of the coil to apply a correcting torque about axis 14 to the gyro 10 upon deviation thereof due to friction or other causes.

Pendulum 36ᵃ is mounted on the side 17ᵇ of body 17 and is connected to coil 40ᵃ by means of elements designated by like numerals with the suffix ᵃ in the same manner as was described with respect to pendulum 36 and its coil 40. Magnet 44ᵃ coacts with magnet coil 40ᵃ to apply a correcting torque to the gyro 10 about axis 12 in the same manner as was described with respect to magnet 44 and coil 40.

Also mounted on crank 30 and actuated thereby is the contact arm 45 coacting with contacts 46 and 47 said arm and contacts comprising means for detecting deviations of the gyro axis from the normally true vertical. Contacts 46 and 47 are carried by vane 48 mounted for rotation by rotary magnet 49 which in turn is mounted in bearing 50, coaxially with axis 12 which rotation will be described in detail later. Contacts 46 and 47 are connected by suitable conductors to the motor 27 and contact 45 is also connected thereto in series with a source of power whereby the motor is energized for rotation in one direction or the other depending upon the position of contact arm 45.

Contact arm 45ᵃ is mounted for rotation with axis 14 in the same manner as contact arm 45 and crank 30 and said arm 45ᵃ cooperates with contacts 46ᵃ and 47ᵃ to control motor 24 in the same manner as was described with respect to contact 45 and motor 27. Contacts 46ᵃ and 47ᵃ are likewise carried by vane 48ᵃ for rotation by rotary magnet 49ᵃ mounted on bearing 50ᵃ in the same manner that contacts 46 and 47 are rotated by magnet 49.

The novel means whereby the rotatable magnet 49 is controlled are illustrated in Fig. 2. The rate of turn responsive device 51 is actuated in response to the rate of turn of the craft about the vertical axis thereof and thereby actuates the contact arm 52 in proportion to said rate of turn. Contact arm 52 is moved over the resistance 53 to vary the current through the winding of rotary magnet 49 whereby said magnet is actuated in magnitude and direction in proportion to the rate of turn of the craft to thereby position the vane 48 and contacts 46 and 47 carried thereby.

In Fig. 3 is illustrated the novel means whereby the rotatable magnet 49ᵃ is controlled. A speed responsive device 54 is comprised of the external tube portion 55 communicating with the pressure responsive bellows 56 which act against the force of spring 58 to operate the arm 59 pivoted at 59ᵃ whereby the contact 60 is moved over the resistance 61 in circuit with the coil of rotatable magnet 49ᵃ to thereby change the current flowing through said coil to position said rotatable magnet in response to changes in the air speed whereby the position of the vane 48ᵃ and the contacts 46ᵃ and 47ᵃ carried thereby is determined.

The operation of the device is as follows: Assuming straight level flight with the gyro element properly indicating the attitude of the craft, axis 11 will assume the true vertical position with the vertical axis of the craft parallel thereto. Upon friction or other sources of error affecting the gyro 10, the gyro precesses and axis 11 will for example assume a position at an angle to the plane of the drawing and extending outwardly therefrom. In other words, axis 11 precesses about axis 12 in a counter-clockwise direction looking in the direction of flight. Upon such precession, crank 30 will also rotate counter-clockwise and thus move contact arm 45 against the contact 47. Motor 27 is thereby actuated to rotate body 17 whereby the body follows the movement of axis 11. Upon the vertical axis of body 17 assuming a position parallel to axis 11, contact arm 45 will assume a position midway between contacts 47 and 46 and motor 27 is de-energized. The rotation of body 17, however, causes pendulum 36 to move into engagement with contact 37 to thereby energize coil 40 whose magnetic field cooperating with the permanent magnet 44 produces a torque about the axis 14 to return axis 11 to the true vertical position. This movement of the gyro causes contact arm 45 to close a circuit through contact 46 whereby motor 27 is energized to rotate in the direction to move body 17 until the vertical axis of said body is parallel to the true vertical position of axis 11.

Precessional movements of axis 11 about axis 14 caused by friction or other means are corrected by means of contact arm 45ᵃ, contacts 46ᵃ, 47ᵃ, motor 24 and pendulum 36ᵃ with its cooperating contacts 37ᵃ, 38ᵃ and coil 40ᵃ coacting with magnet 44ᵃ, in the same manner as described with respect to precession about axis 12.

Means are therefore provided whereby any precession of the axis 11 from the true vertical due to friction, rotation of the earth, or other causes, is automatically corrected during level flight.

The means for correcting the indication of the gyro element during flight on a curved path comprises the same structure as illustrated in Fig. 1 but also includes the cooperating structures illustrated in Figs. 2 and 3 whereby the same device can be utilized to correct the gyro indications during both straight level flight and flight in a curved path.

The operation of the device during curved flight is as follows:

Let us assume that the craft is to be turned counter-clockwise about its vertical axis. During said turn, the craft, as is well known in the art, is banked at an angle proportional to the speed and rate of turn. Since under normal flight conditions the speed during curved flight does not vary from that of straight flying, the rate of turn only need be considered, although it is to be expressly understood that the speed and other factors may be utilized as control factors when so desired and that the rate of turn device may be replaced by any device responsive to acceleration. As illustrated in Fig. 2, upon flight in a curved path, the rate of turn responsive device 51 is actuated in proportion to said rate of turn to move contact arm 52 over resistance 53 to thereby vary the current through the coil of rotatable magnet 49. Rotation of the magnet moves the vane 48 and the contacts 46 and 47 carried thereby so that contact 46 which would otherwise be in contact with contact arm 45 due to the banking of the craft, is moved to the left until arm 45 is in a position midway between contacts 46 and 47. It is to be noted, therefore, that upon flight in a curved path, as long as the craft is operated properly during the turn, the body 17 remains in the inclined position it has assumed with respect to the banked position of the craft.

It is to be particularly noted that during said turn, pendulum 36 is actuated by acceleration forces but due to the fact that contacts 37 and 38 are mounted on the body 17 and assume the same inclined position as body 17 no circuits are closed by the pendulum 36. As long as the craft is properly operated during said turn the pendulum 36 will assume a position midway between the contacts 37 and 38 and no correction will be erroneously applied to the gyro as occurred in the prior art.

If, however, during said curved flight, the gyro 10 precesses due to friction or other causes, for example, about the axis 12, contact 45 will be rotated to close a circuit through one of the contacts 46 and 47 and motor 27 will be energized to thereby rotate the body 17 so that one of the contacts 37 or 38 will engage pendulum 36 to energize coil 40 whereby the precession of the gyro 10 is corrected.

It is to be particularly noted, therefore, that not only is the precession corrected during curved flight but that said correction ensues without changing the correct attitude of the craft so that the turn is made under proper conditions and the gyroscopic device presents a correct indication of the attitude of the craft during said curved flight when such a correct indication is most needed.

Upon a deviation from straight level flight wherein the craft is rotated with respect to its transverse axis, namely, during climb or dive, a speed responsive means as illustrated in Fig. 3 is utilized to cooperate with the device of Fig. 1 whereby any errors in the indication of the gyroscopic device are corrected.

As illustrated in Fig. 3, tube 55 exposed to the medium through which the craft is moving exerts a pressure upon bellows 56 which pressure varies with changes in speed and said changes in pressure move the diaphragm 56 against the force of spring 58 to control the movement of contact 60 over the resistance 61 whereby the current through the coil of rotatable magnet 49ª is varied in order to position vane 48ª and contacts 46ª and 47ª carried thereby in the same manner as was described in connection with the control of vane 48. In this manner, speed changes maintain contacts 46ª and 47ª in such a position that contact 45ª is midway between them. Pendulum 36ª also assumes a position, due to acceleration forces thereon, midway between the contacts 37ª and 38ª whereby the circuits controlled by said contacts are maintained in open position. Upon precession of the gyro about axis 14 due to friction or other causes, contact 45ª is operated to in turn control the motor 24 to move the body 17 and thereby control the pendulum 36ª whereby a circuit is closed by means of either contact 37ª or 38ª to in turn correct the precession of the gyro as was explained in connection with the actuation of pendulum 36.

Means have therefore been provided whereby precessional errors of the gyro are compensated during straight level flight and also during deviation from said straight level flight or in other words, the precessional errors are corrected under any condition of operation of the craft, without affecting the proper attitude of the craft during all conditions of operation thereof.

Although only one embodiment of the invention has been illustrated and described other changes and modifications in form, materials and relative arrangement of parts which will now appear to those skilled in the art, may be made without departing from the scope of the invention.

For example, the rate of turn responsive means of Fig. 2 may be replaced by or combined with other responsive means and likewise the speed responsive means of Fig. 3 may be replaced by or combined with other responsive means whereby the attitude indication is properly maintained under all conditions of flight without affecting the proper attitude of the craft itself.

Reference is therefore to be had to the appended claims for a definition of the limits of the invention.

What is claimed is:

1. In a device of the character described comprising a non-pendulous gyro having a normally vertical spin axis, means mounting said gyro for three degrees of freedom, means for detecting deviations of said gyro axis from the normally true vertical, a body member mounted on the craft for tilting with respect thereto about a normally horizontal axis, means including said detecting means controlled by relative tilting movement of said gyro and member for relatively tilting said member, means including pendulous means mounted on said body, precessing said gyro and maintaining said axis in the true vertical during straight level flight, and means responsive to changes in speed or course of said craft for actuating said detecting means to thereby tilt said member about said horizontal axis to produce actuation of said pendulous means to precess said gyro to maintain said axis erect during departures from straight, level flight.

2. A gyroscopic apparatus for a craft for maintaining a true horizontal plane, comprising a gyro having a normally vertical rotation axis, said gyro cardanically mounted so as to have three degrees of freedom, a body tiltable with respect to said gyro and with respect to the craft, means including means responsive to changes in motion of said craft for tilting said body with respect to said gyro and with respect to said craft to maintain said body in a fixed relation relatively to the apparent vertical, means for restoring the normal position of said rotation axis upon occurrence of deflections, and means for actuating said restoring means comprising means pendulously mounted on said body and responsive to the variation of the position of said body from the apparent vertical, said first-named means including parts operated by relative tilt between said gyro and body and thus responsive to deviations of said gyro for controlling the tilt of said body in order to automatically maintain said horizontal plane without affecting the correct attitude of the craft.

3. An indicating device for aircraft, comprising a non-pendulous gyro vertical mounted for three degrees of freedom, means for correcting the deviation of said gyro from the true vertical, a body member, means mounting said body member for tilting with respect to said craft whereby said member may be tilted with respect to said craft, means for tilting said body to vary the inclination thereof, pendulous means mounted on said body, means responsive to the relative movement of said body and pendulous means controlling said correcting means, and means responsive to the rate of turn of the craft and tilting of said gyro for controlling said body tilting means.

4. An indicating device for aircraft, comprising a non-pendulous gyro vertical mounted for three degrees of freedom, means for correcting the deviation of said gyro from the true vertical, a body member, means mounting said body member for tilting with respect to said craft whereby said member may be tilted with respect to said craft, means for tilting said body to vary the inclination thereof, pendulous means mounted on said body, means responsive to the relative movement of said body and pendulous means for controlling said correcting means, and means responsive to changes in speed of the craft and tilting of said gyro for controlling said body tilting means.

5. An indicating device for aircraft, comprising a non-pendulous gyro vertical mounted for three degrees of freedom, means for correcting the deviation of said gyro from the true vertical, a body member, means mounting said body member for tilting with respect to said craft whereby said body may be tilted with respect to said craft, means for tilting said body to vary the inclination thereof, pendulums mounted on said body, means responsive to relative movement of said body and pendulums for controlling said correcting means, and means responsive to tilting of said gyro and changes in motion of said craft, for controlling said body tilting means.

6. An indicating device for aircraft, comprising a gyro vertical mounted for three degrees of freedom, means for correcting any deviation of said gyro from the vertical, a body member, means mounting said body member on said craft for tilting with respect to said craft about two mutually perpendicular axes, means for rotating said body about each of said axes to produce tilting thereof, means including pendulous means mounted on said body for controlling said correcting means, means responsive to tilting of said gyro with respect to a part on said body member for controlling said rotating means upon tilting about at least one of said axes, and means responsive to changes in motion of said craft for controlling said part and thereby said rotating means.

7. An indicating device for aircraft or the like, comprising a non-pendulous gyro having a normally vertical spin axis, a mounting for said gyro providing three degrees of freedom, a member mounted on said craft for universal pivotal movement with respect to said craft whereby tilting of said member with respect to said craft may occur about two normally horizontal mutually perpendicular axes, means for tilting said member, means for correcting any deviations of said gyro axis from the vertical including pendulous means mounted on said member causing precession of said gyro upon relative movement of said pendulum and member, means responsive to changes in position of said gyro relatively to a pivotal part on said member for rendering said tilting means operative, and means responsive to changes in movement of said craft for actuating said part to render said tilting means ineffective during the correct indication of said gyro.

8. An indicating device for aircraft, comprising a normally horizontal member mounted on said craft for two degrees of pivotal movement with respect thereto, a gyro vertical, means mounting said gyro on said member for three degrees of freedom with respect thereto, means normally responsive to relative pivotal movement of said gyro and a part pivotal on said member for controlling the pivotal position of said member with respect to said craft, pendulous means mounted on said member, means responsive to rate of turn of said craft for pivoting said part to thereby cause tilting of said member, and means controlled by said pendulous means for applying a precessing force to said gyro upon deviation thereof during straight, level flight.

9. An indicating device for aircraft, comprising a gyro vertical, a normally horizontal support for said gyro, means mounting said gyro on said support for three degrees of freedom with respect thereto, means mounting said support for two degrees of pivotal movement with respect to said craft, means responsive to rate of turn and speed of said craft for tilting said support relative to the true horizontal plane, means controlled by the movement of said support for applying a precessing force to said gyro, and means responsive to relative pivotal movement of said gyro and support for controlling the position of said support with respect to said craft.

10. An indicating device for aircraft, comprising a gyro vertical mounted for three degrees of freedom, a follow-up member, means controlled by relative tilting between said member and said gyro for actuating said follow-up member to repeat the positions of said gyro during straight flight, pendulous means mounted on said follow-up member, means responsive to changes in attitude of said craft for operating a portion of said first-named means for tilting said follow-up member while said pendulous means retains its then position, and means responsive to the ensuing relative tilt of said pendulous means and follow-up member for applying a precessing force to said gyro.

PAUL EDUARD KOSTER.